(12) United States Patent
Streater, Jr. et al.

(10) Patent No.: US 9,080,423 B2
(45) Date of Patent: Jul. 14, 2015

(54) 3-RING NON-EXTRUSION SEAL ASSEMBLY AND METHOD

(75) Inventors: James R. Streater, Jr., Humble, TX (US); Jose Saldana, Houston, TX (US); Daniel Hernandez, Jr., Pasadena, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 457 days.

(21) Appl. No.: 13/269,829

(22) Filed: Oct. 10, 2011

(65) Prior Publication Data

US 2012/0086227 A1    Apr. 12, 2012

Related U.S. Application Data

(60) Provisional application No. 61/391,741, filed on Oct. 11, 2010.

(51) Int. Cl.
*E21B 31/18* (2006.01)
*F16J 15/06* (2006.01)
*E21B 33/00* (2006.01)

(52) U.S. Cl.
CPC ............... *E21B 31/18* (2013.01); *F16J 15/067* (2013.01); *E21B 2033/005* (2013.01); *Y10T 29/49826* (2015.01)

(58) Field of Classification Search
USPC ......... 277/327–328, 337, 339, 342, 529, 530, 277/531, 584, 608, 609, 616, 638, 630, 637
See application file for complete search history.

(56) References Cited

U.S. PATENT DOCUMENTS

| | | | | |
|---|---|---|---|---|
| 3,124,502 A * | 3/1964 | Radke | ................. | 428/66.4 |
| 3,718,338 A | 2/1973 | Traub | ................. | 277/165 |
| 4,053,163 A * | 10/1977 | Vegella | ................. | 277/530 |
| 4,231,578 A | 11/1980 | Traub | ................. | 277/121 |
| 4,349,205 A | 9/1982 | McGee et al. | ................. | 277/188 A |
| 4,369,977 A | 1/1983 | Bishop et al. | ................. | 277/1 |
| 5,085,479 A | 2/1992 | Taylor | ................. | 294/86.17 |
| 5,282,653 A | 2/1994 | LaFleur et al. | ................. | 285/110 |
| 5,348,351 A | 9/1994 | LaFleur et al. | ................. | 285/110 |
| 5,678,635 A * | 10/1997 | Dunlap et al. | ................. | 166/387 |
| 5,857,520 A * | 1/1999 | Mullen et al. | ................. | 166/196 |
| 6,896,079 B1* | 5/2005 | Axelsson | ................. | 180/11 |
| 2004/0036225 A1* | 2/2004 | Ritter et al. | ................. | 277/328 |
| 2010/0258311 A1 | 10/2010 | Craig et al. | | |

FOREIGN PATENT DOCUMENTS

| CN | 2309417 Y | 3/1999 |
|---|---|---|
| FR | 2 455 227 | 11/1980 |

OTHER PUBLICATIONS

"Bowen® High Pressure Casing Patch", National Oilwell Varco, www.nov.com, 2006.
"High Pressure Casing Patches Instruction Manual", www.nov.com, 2007.
International Search Report and Written Opinion, Application No. PCT/US2011/055750 mailed Jan. 17, 2012.
English Translation of Office Action, received May 9, 2015.

* cited by examiner

*Primary Examiner* — Vishal Patel
(74) *Attorney, Agent, or Firm* — Winston & Strawn LLP

(57) ABSTRACT

A three-ring seal assembly is provided to seal across extrusion gaps of varying size when used during down hole fishing operations.

15 Claims, 5 Drawing Sheets

3-RING NON-EXTRUSION SEAL ASSEMBLY AND METHOD

PRIORITY

This application is a non-provisional of and claims priority to U.S. Provisional Application No. 61/391,741 entitled, "3-RING NON-EXTRUSION SEAL ASSEMBLY AND METHOD," filed Oct. 11, 2010, also naming James R. Streater, Jr., Jose Saldana, and Daniel Hernandez, Jr. as inventors, the disclosure of which is hereby incorporated by reference in its entirety.

FIELD OF THE INVENTION

The present invention relates generally to non-extrusion rings used in sealing mechanisms and, more particularly, to a three ring non-extrusion subassembly used in down hole fishing operations for reducing the extrusion gap when sealing on a shaft of varying diameter.

BACKGROUND OF THE INVENTION

Currently, overshots are used to externally engage, pack off, and retrieve twisted-off or lost tubing, drill pipe, coupling, tool joints, casing, or other similar fish during oil field operations. The basic design of an overshot consists of a bowl, grapple, and control. Each grapple has a maximum and minimum catch size that it can catch. For the prior art, that range can be 1/32" over and 3/32" under the nominal size, resulting in an effective total range of 1/8". In addition, wide catch overshots have been designed to catch an even larger range of fish. By definition, that range is translated into the range that the seal must be able to seal upon. The prior art utilizes a type of seal known as a Type "A" packer. Although this seal could effectively seal on the fish, the Type A method of sealing, however, is limited to the largest sizes for that overshot assembly. As the desired catch size decreased, a different sealing method is needed, due to the increasing size of the extrusion gap.

Accordingly, there is a need in the art for a non-extrusion subassembly to effectively seal across the increasingly-sized extrusion gaps.

SUMMARY OF THE INVENTION

The present invention provides methods and assemblies for reducing the extrusion gap when sealing on shafts of varying diameters. Described herein is a three-ring seal assembly comprising a seal and a first, second, and third rings for reducing the extrusion gap during a downhole fishing operation. The seal and rings have a plurality of angled edges which work in conjunction with each other to force the rings out into the extrusion gap such that the gap is reduced, which thereby allows the seal to seal around a large range of fish.

BRIEF DESCRIPTION OF THE DRAWINGS

FIGS. 3A-3D-2 illustrate a three-ring seal assembly according to an exemplary embodiment of the present invention;

DESCRIPTION OF ILLUSTRATIVE EMBODIMENTS

Illustrative embodiments and related methodologies of the invention are described below as they might be employed to provide a three ring non-extrusion subassembly. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description and drawings.

Figure 1:
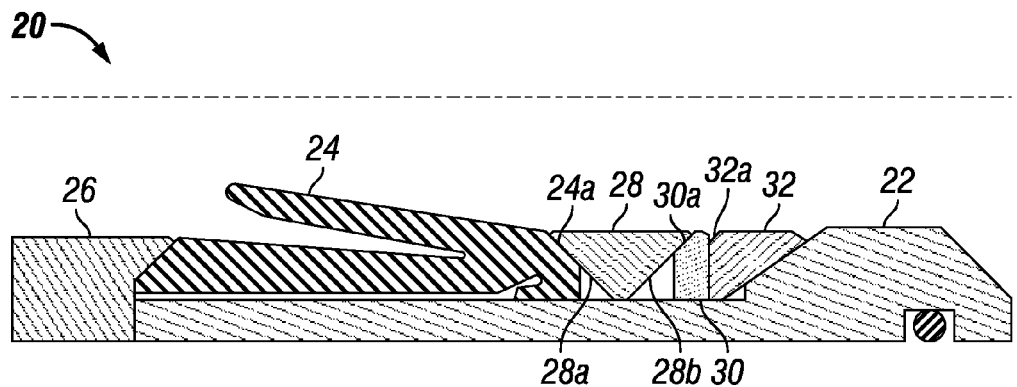
FIG. 1 is a sectional view of a seal assembly according to an exemplary embodiment of the present invention.
Figure 2:
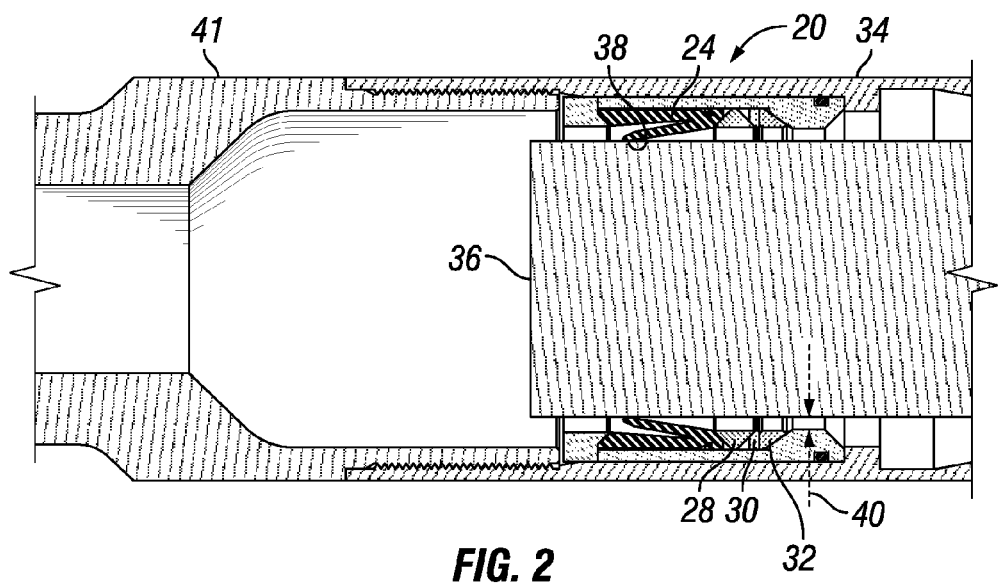
FIG. 2 is a section view of an overshot having a seal assembly therein according to an exemplary embodiment of the present invention.

Referring to FIGS. 1 and 2, seal assembly 20 is illustrated according to an exemplary embodiment of the present invention. Herein, embodiments of the present invention will be described in relation to a wide catch overshot. Please note, however, those ordinarily skilled in the art having the benefit of this disclosure realize the invention could be utilized with a variety of downhole tools used to seal around cylindrical parts having large extrusion gaps.

Seal assembly 20 is installed in the upper portion of bowl 34 in order to achieve a high pressure seal. Seal assembly 20 includes body 22, seal 24, non-extrusion ring 28, solid ring 30, C-ring 32, and retainer ring 26. As will be described in more detail below, as fish 36 enters bowl 34, fish 36 pushes down the inner lip 38 of seal 24 and continues traveling into bowl 34 until it comes into contact with top sub 41. Thereafter, pump pressure is applied and seal assembly 20 acts to seal around fish 36 as will be described.

Figure 3A:
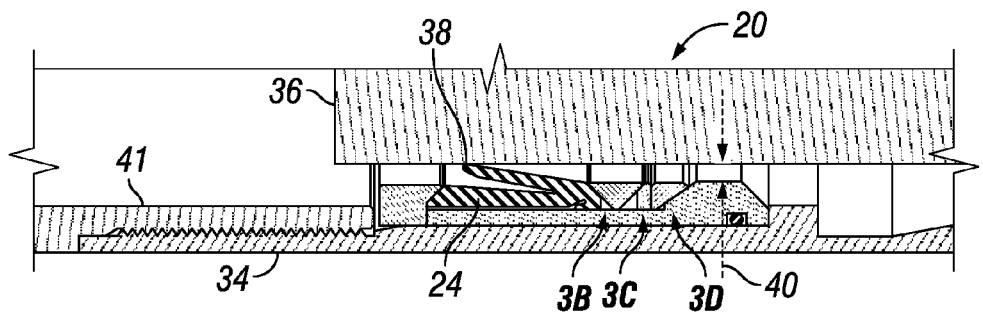
Figure 3B:
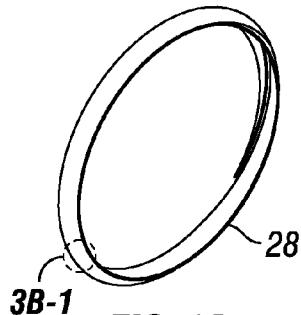
Figure 3C:
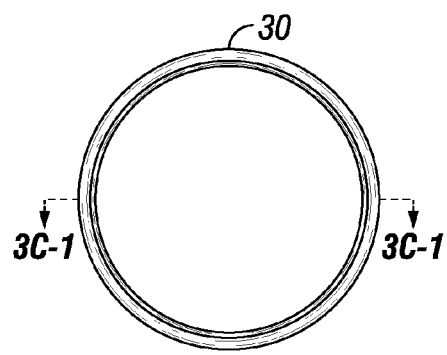
Figures 1, 3C:
Figure 3D:
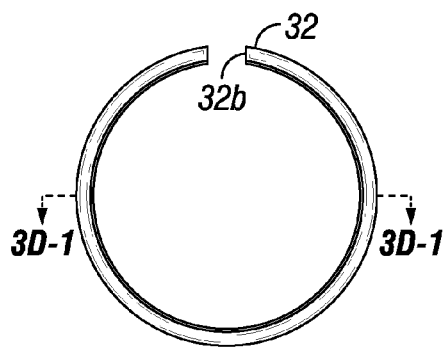
Figures 1, 3D:
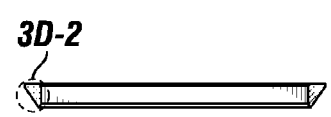
Figures 1, 3B:
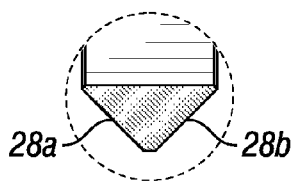
Figures 2, 3C:
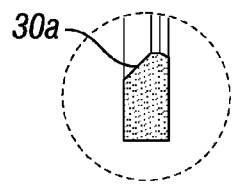
Figures 2, 3D:
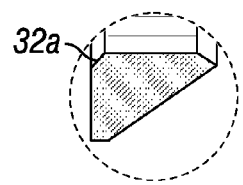

Referring to FIGS. 1-3D-2, seal assembly 20 is comprised of the non-extrusion ring 28, solid ring 30, and C-ring 32, as previously described. In this exemplary embodiment, non-extrusion ring 28 is a solid or scarf cut ring, having angled faces 28a, 28b (FIG. 1, 3B-1), which give non-extrusion ring 28 a triangular shape. Angled face 28a is in contact with mating angled surface 24a of seal 24, which is molded with a parallel angle. Angled face 28b mates with angled face 30a of solid ring 30. As best shown in FIGS. 1, 3D, and 3D-2, C-ring 32 is a cut ring with an angled face 32a. The cut 32b in C-ring 32 allows the ring to compress when pressure, such as pump pressure, is applied. Cut 32b is sized such that when C-ring 32 compresses, extrusion gap 40 is reduced by approximately 50%. However, those ordinarily skilled in the art having the benefit of this disclosure realize this reduction percentage is size specific and would be dependent upon the dimensions of the various rings of the seal assembly.

The purpose of solid ring 30 is to provide a bridge between non-extrusion ring 28, adjacent the upper end of ring 30, and C-ring 32, adjacent the lower end of ring 30. As previously mentioned, non-extrusion ring 28 comprises a scarf cut (FIG. 3B), as understood in the art. Having cuts in both non-extrusion ring 28 and C-ring 32 limits their ability to compress if placed in conjunction with each other. Solid ring 30 also provides support for non-extrusion ring 28 as the shaft diameter of fish 36 decreases.

Figure 7A:
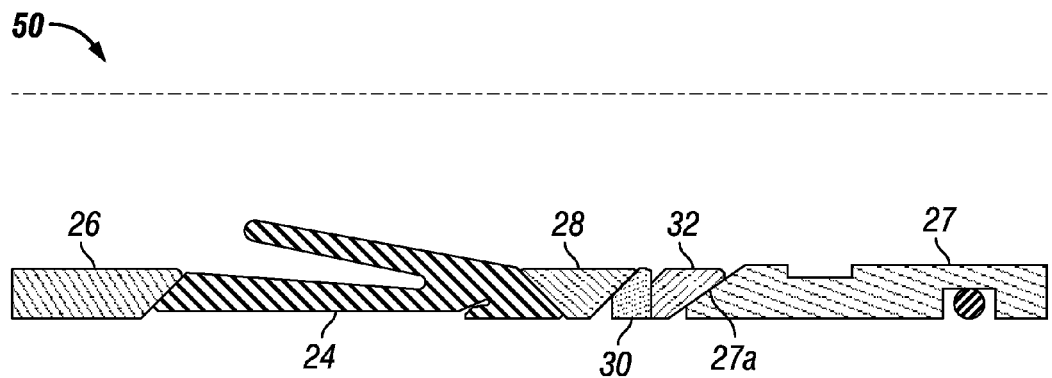
FIGS. 7A & 7B illustrate sectional views of an exemplary embodiment of the seal assembly having a secondary retainer.
Figure 7B:
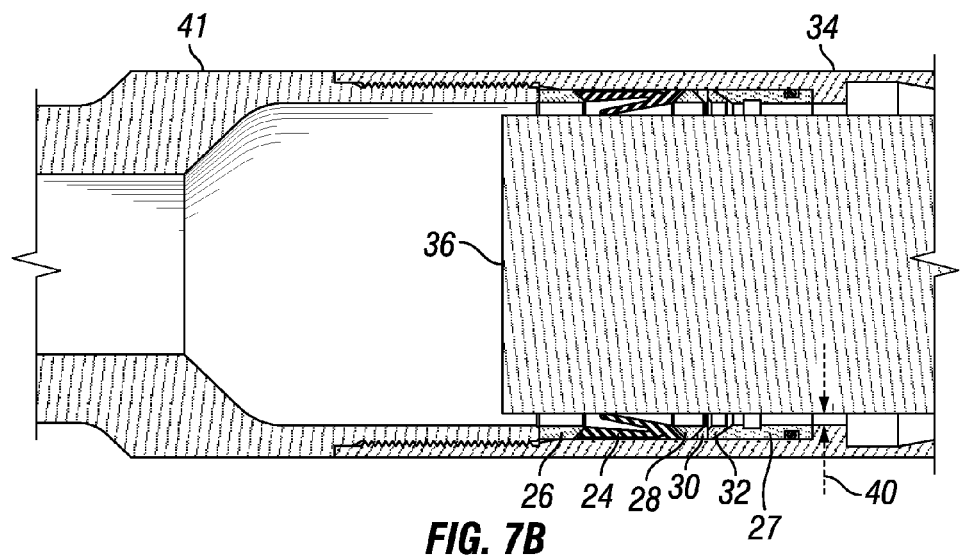

Referring to the exemplary embodiments of FIGS. 2-7B, operation of the present invention will now be described. Because the overshot used in conjunction with the present inventive sealing assembly is capable of catching many sizes of fish, seal assembly 20 is designed accordingly. Therefore, seal assembly 20 can be used to seal on a wide range of fish, such as, but not limited to, small (FIG. 4), midsized (FIG. 5), large diameter fish (FIG. 6), as can be ascertained by the respective sizes of extrusion gap 40 in each figure (i.e., the larger gap 40, the smaller the fish). For max nominal size fish, the body 22 (FIG. 1) would not be used. Instead, seal assembly 50 (FIG. 7A/B) is utilized and placed directly in bowl 34, which also includes secondary retainer 27 as shown in FIGS. 7-7B. In the exemplary embodiments, note that the profile for a given range seal range is set. Therefore, a specific seal can be used for different size fish as long as the range is the same. For a given range seal, all that is changed are the diametrical dimensions when utilized for different size fish.

Figure 4:
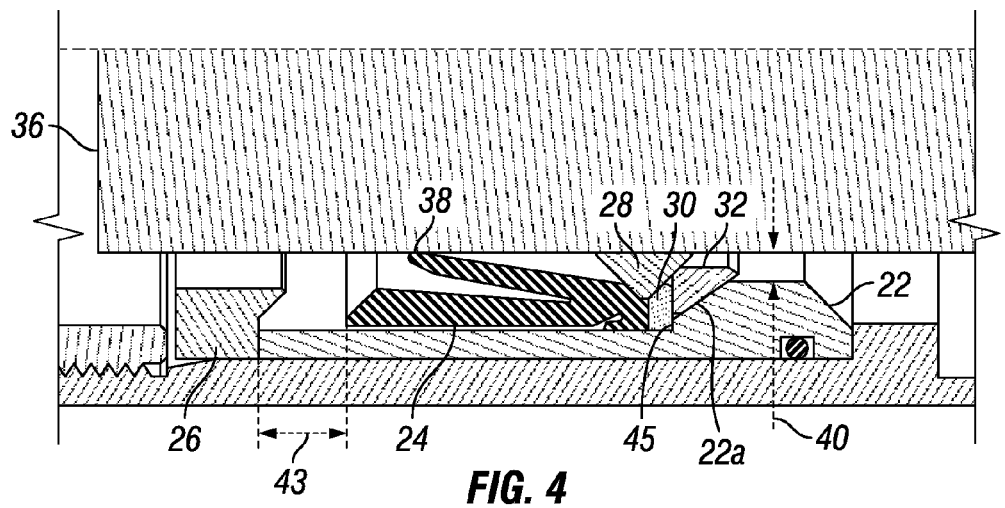
FIG. 4 illustrates a sectional view of an exemplary embodiment of the seal assembly sealing across a large-size extrusion gap.
Figure 5:
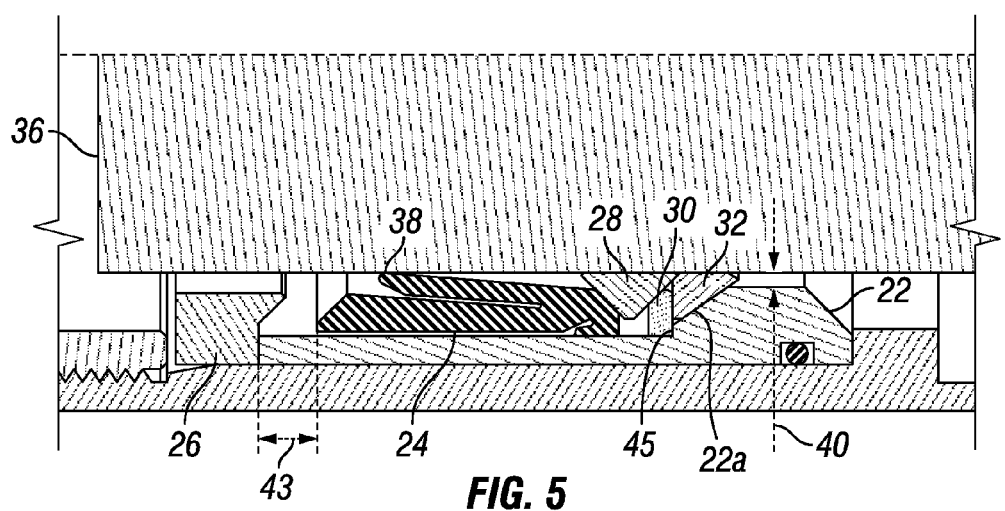
FIG. 5 illustrates a sectional view of an exemplary embodiment of the seal assembly sealing across a medium-size extrusion gap.
Figure 6:
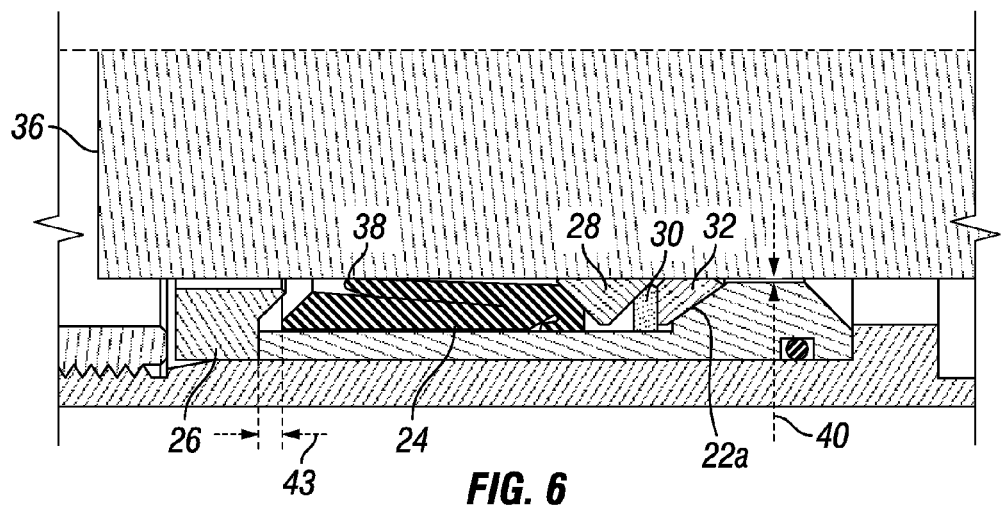
FIG. 6 illustrates a sectional view of an exemplary embodiment of the seal assembly sealing across a small-size extrusion gap.

Referring to FIG. 2, as fish 36 enters bowl 34, it moves upward past lip 38 of seal 20 and continues until it comes into contact with top sub 41. Thereafter, pump pressure is applied which results in a downward pressure being applied to seal 38, thus causing lip 38 to seal against fish 36. Once this occurs, as shown in FIG. 4, a gap 43 is formed between the lower end of retainer ring 26 and seal 24. Also, simultaneously, the downward force is transferred from seal 24, through non-extrusion ring 28 and solid ring 30, and C-ring 32. Because of the various mating angled faces, this downward pressure forces non-extrusion ring 28 and C-ring 32 out into extrusion gap 40, thereby reducing the size of the extrusion gap 40 at the two points.

Further referring to FIGS. 1-6, as downward pressure continues to be applied, solid ring 30 is forced into abutment 45, where it is no longer allowed to move. During compression of non-extrusion ring 28, angled face 28b mates with angled faces 30a and 32a. Hereafter, C-ring 32, which has already slid up angled face 22a, compresses and "bottoms out" when the two ends (created by cut 32b) of C-ring 32 contact each other, thereby decreasing the size of gap 40. As more pressure is applied, non-extrusion ring 28 further compresses. As the diameter of non-extrusion ring 28 decreases, it gains support from the solid ring 30 and eventually comes into contact with the shaft of fish 36 and effectively reduces the extrusion gap 40 to zero, as shown in FIGS. 4 (small fish), 5 (mid-size fish), and 6 (large fish). Moreover, the exemplary embodiment illustrated in FIGS. 7A & 7B operates in the same way as those embodiments previously described, except that C-ring 32 now mates with angled face 27a of secondary retainer 27 when downward pressure is applied. Accordingly, as the nominal size of fish 36 begins to decrease, the seal assembly of the present invention essentially re-configures to accommodate the associated larger extrusion gap 40. Therefore, the seal assembly can be used to seal across a wide range of extrusion gaps, which translates into the ability to seal upon a wide range of fish having varying diameters.

Figure 8A:
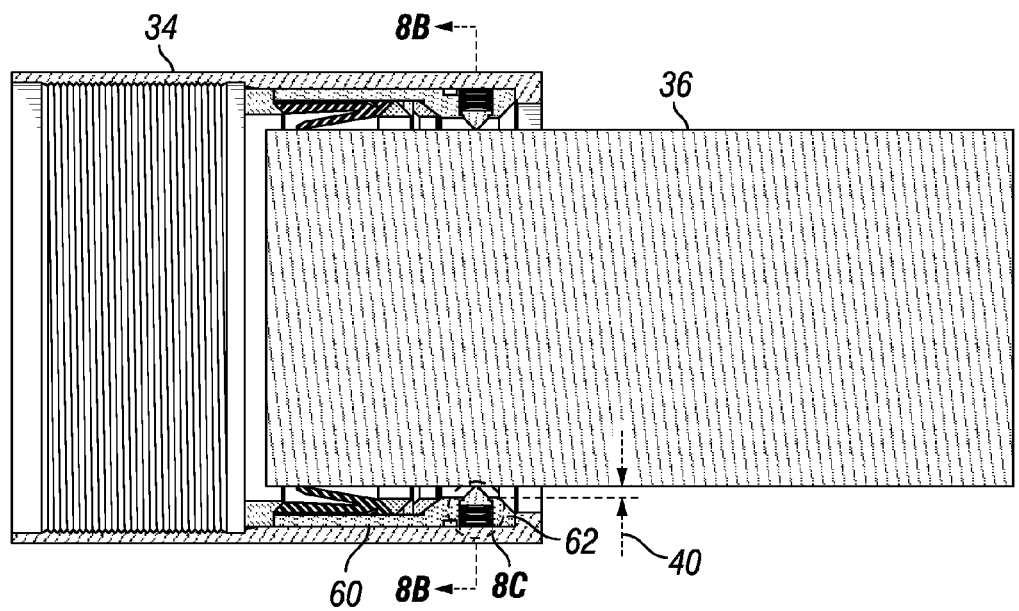
FIGS. 8A-8C illustrate a seal assembly having a spring pin assembly according to an exemplary embodiment of the present invention.
Figure 8B:
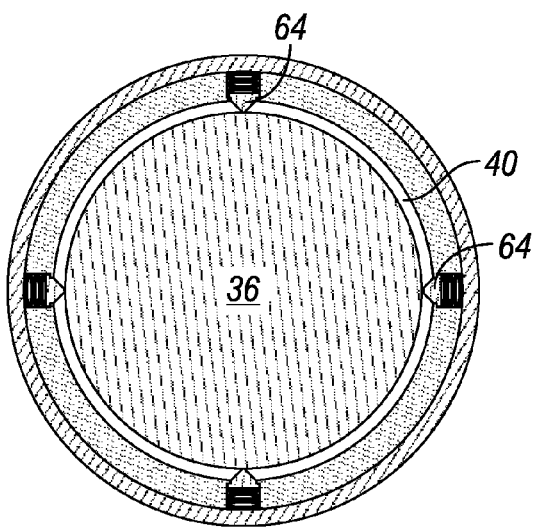
Figure 8C:
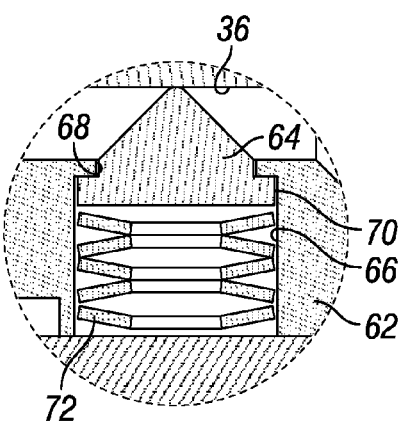

Referring to FIGS. 8A-8C, an alternative exemplary embodiment of the present invention will now be described. Seal assembly 60 may be any of the previous described seal assemblies. However, seal assembly 60 further includes an alignment mechanism, such as spring pin assembly 62, at its lower end which is used to align fish 36 evenly within seal assembly 60. Further referring to FIGS. 8A-8c, a plurality of pyramid, or similarly, shaped pins 64 are spaced around seal assembly 60. The body of seal assembly 62 comprises an opening 66 in which pin 64 is inserted. A collar 68 surrounds the inner end of opening 66 which retains pin 64 within opening 66 (via the mating engagement of shoulder 70 with collar 68). A spring 72 is positioned inside opening 66 adjacent to pin 64 in order to force pin 64 out against fish 36. Spring 72 can be any variety of spring having adequate force to centralize the shaft.

Accordingly, as fish 36 enters bowl 34, the top of fish 36 comes into contact with pin 64. Since the face of pin 64 is pyramid-shaped, friction is reduced, thereby also reducing the likelihood that fish 36 will become jammed. As pin 64 is forced inwardly and spring 72 is compressed, the opposing force exerted on the sides of fish 36 (by spring 72) acts to align fish 36 evenly in the center of bowl 34. Although four separate pins 64 are illustrated in this exemplary embodiment, those ordinarily skilled in the art having the benefit of this disclosure realize more or less pins may be spaced around the bowl as desired. In addition, the same skilled artisan would realize a variety of other alignment mechanisms may be utilized as well. Thereafter, seal assembly 60 operates to seal around fish 36 as previously described.

An exemplary embodiment of the present invention provides a three-ring seal assembly comprising: a seal having an upper and lower end; a first ring adjacent the lower end of the seal, the first ring having an upper and lower end; a second ring adjacent the lower end of the non-extrusion ring, the second ring having an upper and lower end; and a third ring adjacent the lower end of the second ring. Another embodiment comprises an alignment mechanism to align an object to be sealed within the seal assembly. In another, the alignment mechanism is a plurality of spring-pin assemblies spaced around the seal assembly. In yet another, the first ring comprises angled faces at the upper and lower end of the first ring, thereby giving the first ring a "V" shaped profile.

In another exemplary embodiment, the second ring has an angled face on the upper end of the second ring, the angled face on the upper end of the second ring being adapted to mate with the angled face on the lower end of the first ring. In yet another, the third ring comprises an angled face on an upper end of the third ring, the angled face on the upper end of the third ring being adapted to mate with the angled face on the lower end of the first ring. In another embodiment, the third ring further comprises an angled face at a lower end of the third ring, the angled face at the lower end of the third ring mating with an angled surface of a seal assembly body. In yet another, the first ring is a non-extrusion ring comprising a scarf cut. In another embodiment, the third ring is a C-ring. In yet another exemplary embodiment, the seal assembly forms part of an overshot for use in a down hole operation.

An exemplary methodology of the present invention provides a method of manufacturing a three-ring seal assembly, the method comprising the steps of: (a) providing a seal having an upper and lower end; (b) providing a first ring adjacent the lower end of the seal, the first ring having an upper and lower end; (c) providing a second ring adjacent the lower end of the non-extrusion ring, the second ring having an upper and lower end; and (d) providing a third ring adjacent the lower end of the second ring. Another methodology comprises the step of providing a plurality of spring-pin assemblies spaced around the seal assembly. Yet another comprises the step of providing angled faces at the upper and lower end of the first ring, thereby giving the first ring a "V" shaped profile. Another methodology comprises the step of providing an angled face on the upper end of the second ring, the angled face on the upper end of the second ring being adapted to mate with the angled face on the lower end of the first ring.

Yet another exemplary methodology comprises the step of providing an angled face on an upper end of the third ring, the angled face on the upper end of the third ring being adapted to mate with the angled face on the lower end of the first ring. Yet another comprises step of providing an angled face at a lower end of the third ring, the angled face at the lower end of the third ring mating with an angled surface of a seal assembly body. In another methodology, step (b) further comprises the step of providing the first ring as a non-extrusion ring comprising a scarf cut. In yet another, step (d) further comprises the step of providing the third ring as a C-ring. Another exemplary methodology, comprises the step of incorporating the seal assembly into an overshot for use in a down hole operation.

Another exemplary methodology of the present invention provides a method of using a three-ring seal assembly in a down hole operation, the method comprising the steps of: (a) inserting a fish into a housing comprising the seal assembly, the seal assembly comprising: a seal having an upper and lower end; a first ring adjacent the lower end of the seal, the first ring comprising an upper and lower end; a second ring adjacent the lower end of the non-extrusion ring, the second ring comprising an upper and lower end; and a third ring adjacent the lower end of the solid ring; (b) causing the seal to contact the fish, wherein an extrusion gap is present between the seal assembly and the fish; and (c) sealing across the extrusion gap using the seal assembly. In another, step (c) further comprises the steps of: forcing the seal toward the first ring; forcing the third ring out into the extrusion gap; and forcing the first ring out into the non-extrusion gap, the first ring coming in contact with the fish, thereby sealing across the extrusion gap using the seal assembly. In yet another methodology, step (c) is accomplished using pump pressure. Another methodology comprises the step of utilizing a spring-pin assembly to align the fish within the seal assembly.

Unlike the prior art, which utilizes a single non-extrusion ring, embodiments of the present invention provide the ability to partially close the extrusion gap, before the final seal is accomplished, through the use of a three ring non-extrusion assembly, thereby providing the ability to effectively seal a much larger range of extrusion gaps (i.e., larger range of fish). Although various embodiments have been shown and described, the invention is not limited to such embodiments and will be understood to include all modifications and variations as would be apparent to one skilled in the art. For example, one ordinarily skilled in the art having the benefit of this disclosure realize the present inventive seal could be modified to fit a variety of sizes of fish. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A three-ring seal assembly comprising:
   a seal having an upper and a lower end;
   a first ring having a substantially triangular profile, wherein the first ring is a non-extrusion ring having a scarf cut and abutting the lower end of the seal, the first ring also having, a sealing diameter, an assembly-facing diameter, an angled face at an upper end and an angled face at a lower end, wherein the angled faces converge from the sealing diameter to the assembly diameter;
   a second ring abutting the lower end of the first ring, the second ring having an upper end and a lower end, wherein the second ring has an angled face on the upper end of the second ring that mates with the angled face on the lower end of the first ring; and
   a third ring abutting the lower end of the second ring wherein the third ring comprises an angled face on an upper end of the third ring, such that the angled face on the upper end of the third ring mates with the angled face on the lower end of the second ring when the three-ring seal assembly is in the sealed position.

2. The seal assembly of claim 1, further comprising an alignment mechanism to align an object to be sealed within the seal assembly.

3. The seal assembly of claim 2, wherein the alignment mechanism is a plurality of spring-pin assemblies spaced around the seal assembly.

4. The seal assembly of claim 1 further comprising a seal assembly body connected to the seal, the first ring, the second ring and the third ring and, wherein the third ring further comprises an angled face at a lower end of the third ring, the angled face at the lower end of the third ring mating with an angled surface of the seal assembly body.

5. The seal assembly of claim 1, wherein the third ring is a C-ring.

6. The seal assembly of claim 1, wherein the seal assembly forms part of an overshot for use in a down hole operation.

7. A method of manufacturing a three-ring seal assembly, the method comprising the steps of:
   (a) providing a seal having an upper end and a lower end;
   (b) providing a first ring having a substantially triangular profile, wherein the first ring is a non-extrusion ring having a scarf cut and abutting the lower end of the seal, the first ring also having a sealing diameter, an assembly-facing diameter, an angled face at the upper end and an angled face at a lower end, wherein the angled faces converge from the sealing diameter to the assembly diameter;
   (c) providing a second ring that abuts the lower end of the first ring, the second ring having an upper end and a lower end, wherein the second ring has an angled face on the upper end of the second ring that mates with the angled face on the lower end of the first ring; and
   (d) providing a third ring that abuts the lower end of the second ring wherein the third ring comprises an angled face on an upper end of the third ring, such that the angled face on the upper end of the third ring mates with the angled face on the lower end of the second ring when the three-ring seal assembly is in the sealed position.

8. The method of claim 7, further comprising the step of providing a plurality of spring-pin assemblies spaced around the seal assembly.

9. The method of claim 7, further comprising the step of providing a seal assembly body connected to the seal, the first ring, the second ring and the third ring and providing an angled face at a lower end of the third ring, the angled face at the lower end of the third ring mating with an angled surface of the seal assembly body.

10. The method of claim 7, wherein step (d) further comprises the step of providing the third ring as a C-ring.

11. The method of claim 7, further comprising the step of incorporating the seal assembly into an overshot for use in a down hole operation.

12. A method of using a three-ring seal assembly in a down hole operation, the method comprising the steps of:
(a) inserting a fish into a housing comprising the seal assembly comprising:
a seal having an upper end and a lower end;
a first ring having a substantially triangular profile, wherein the first ring is a non-extrusion ring having a scarf cut and abutting the lower end of the seal, the first ring also having a sealing diameter, an assembly-facing diameter, an angled face at the upper end and an angled face at a lower end, wherein the angled faces converge from the sealing diameter to the assembly diameter;
a second ring abutting the lower end of the first ring, the second ring comprising an upper end and a lower end, wherein the second ring has an angled face on the upper end of the second ring that mates with the angled face on the lower end of the first ring; and
a third ring abutting the lower end of the second ring, wherein the third ring comprises an angled face on an upper end of the third ring, such that the angled face on the upper end of the third ring mates with the angled face on the lower end of the second ring when the three-ring seal assembly is in the sealed position;
(b) causing the seal to contact the fish, wherein an extrusion gap is present between the seal assembly and the fish; and
(c) sealing across the extrusion gap using the seal assembly.

13. The method of claim 12, wherein step (c) further comprises the steps of:
forcing the seal toward the first ring;
forcing the third ring out into the extrusion gap; and
forcing the first ring out into the non-extrusion gap, the first ring coming in contact with the fish, thereby sealing across the extrusion gap using the seal assembly.

14. The method of claim 12, wherein step (c) is accomplished using pump pressure.

15. The method of claim 12, further comprising the step of utilizing a spring-pin assembly to align the fish within the seal assembly.

* * * * *